INVENTOR.
BERNHARDT STAHMER

United States Patent Office 2,962,100
Patented Nov. 29, 1960

2,962,100

HELICOPTER ENGINE

Bernhardt Stahmer, 1509 Chicago St., Omaha, Nebr.

Filed Sept. 14, 1955, Ser. No. 534,280

3 Claims. (Cl. 170—135.22)

This invention relates to helicopter engine design and more particularly it is an object of this invention to provide a helicopter engine which is adapted to operate at a low speed without the use of reduction gears.

In the past, engines for helicopters have been of a high speed type whereby reduction gear means is used to gear the speed down. It is well known that the blades of helicopter propellers rotate at a vastly slower speed than airplane propellers and are even operating at a speed slow enough to give a picture to the naked eye.

It is therefore an object of this invention to eliminate the excessively heavy reduction gear assembly of a helicopter with its attendant power loss and with its attendant increase in the general weight of the air craft by providing an engine which will operate at a low speed by having low speed characteristics inherent in the engine from the beginning, thus eliminating the necessity of adding an auxiliary heavy reduction gear assembly.

A further object is to provide a helicopter engine as described in which two propellers are used operating each on a shaft, one of the shafts extending through the other, the outer shaft being hollow to permit this, thus making it possible for two concentric helicopter blades to be operating one in a clockwise direction and one in a counter-clockwise direction to the air craft with stability.

Another object is to attain this stability through an outer hollow shaft and an inner shaft, both shafts operating from the same engine.

A further object of this invention is to provide a helicopter engine particularly adapted for the efficient delivery of power to propellers at the rearward end of the helicopter for forward propulsion.

A further object of this invention is to provide a helicopter engine design which is particularly adapted for the delivery of power not only to the horizontally rotating blade but also to one or more propeller blades disposed at the rearward end of the helicopter, being done in a fashion needing few parts and with little frictional power loss.

Another object is to provide a helicopter engine design for delivering power to two counter-rotating propellers disposed at the rearward end of the helicopter.

A further object is to provide a helicopter engine design which is particularly adapted to deliver power not only to horizontally rotating blades but also to blades disposed either forwardly or rearwardly, or forwardly and rearwardly both, of the propeller, the latter vertically rotating and being for the purpose of horizontal propulsion.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
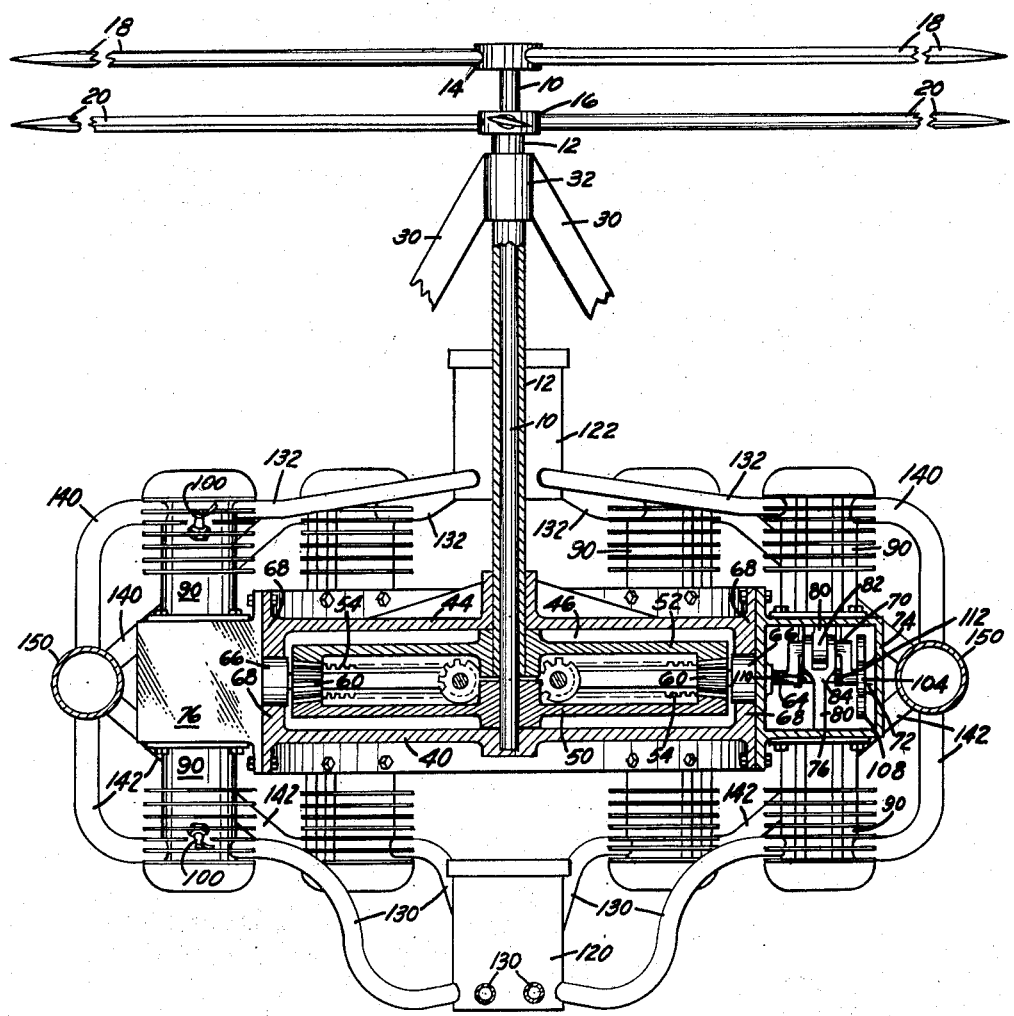
Fig. 1 is a frontal elevation of the helicopter engine of this invention shown with a forward portion thereof broken away to illustrate the interior construction. The view also shows propellers of the helicopter type and a bearing and support assembly for the propeller shaft, portions of all of these parts being broken away for convenience of illustration.

The engine of this invention has an inner main shaft 10 and an outer hollow cylindrical main shaft 12 which latter is disposed about the shaft 10 and is rotatably mounted around the shaft 10 for rotation in a direction reverse to the shaft 10, as later described.

The inner main shaft 10 is attached to an upper propeller 14 disposed for horizontal rotation to propel a helicopter upwardly.

The outer power shaft 12 is attached at its upper end to a second and lower helicopter propeller assembly 16 which rotates horizontally in a position spaced a short distance beneath the propeller assembly 14. Each propeller assembly 14 and 16 has a plurality of blades 18 and 20 respectively.

Suitable bracing means, such as the braces 30, shown in Figure 1, are attached to a bearing assembly 32, rotatably receiving the outer shaft 12. The braces 30 extend to an aircraft, not shown.

The inner end of the center shaft 10 is rotatably received in a housing member 40 which latter is disposed generally transverse to the shaft 10. Another housing member 44 is disposed spaced apart from the housing member 40 in a direction lengthwise of the shaft 10 for creating a hollow space 46 between the housing portions 40 and 44.

In the hollow space 46 are two driven gears 50 and 52. The gears 50 and 52 are mounted alongside each other with the gear 50 below the gear 52. The gear 50 is secured to the shaft 10 for rotation therewith, and the gear 52 is secured to the outer shaft 12 for rotation therewith. The outer shaft 12 terminates above the lower gear 50.

The gears 50 and 52 each have teeth arranged in a ring around the circumferences thereof, and on the inner side of the gears 50 and 52, whereby the teeth 54 of each gear 50 and 52 are disposed facing each other. The gears 50 and 52 are preferably of the same size and their teeth 54 are preferably disposed in positions directly opposite each other and similarly spaced from the shaft 10.

The teeth 54 of each gear 50 and 52 extend radially with respect to the shaft 10. The teeth 54 of the gear 50 are spaced apart from the teeth 54 of the gear 52 and between these respective rows of teeth a plurality of driving pinions 60 are disposed. The driving pinions 60 are preferably two or more in number and are disposed equidistantly spaced apart around the periphery of the gears 50 and 52.

The pinions 60 are each mounted on the inner end of a crankshaft 64, the inner ends of the crankshaft 64 being straight and being disposed radially with respect to the shaft 10, and being rotatably mounted in bearings 66 which are secured to inwardly extending transverse portions 68 of the housing sections 40 and 44.

The crankshafts 64 extend outwardly from the bearing 66 and are provided with offset crankthrow portions 70.

The outer end of each crankshaft 64 is mounted in a suitable bearing 72 attached to the outer wall 74 of a housing 76 which can be and is preferably rectangular in cross section, as seen in Figure 1. The housing 74 shown in cross section in Figure 1 is but one of many housings 74, there being a housing 74 for each crankshaft 64, and six in total in the example shown in the drawings.

Figure 2:
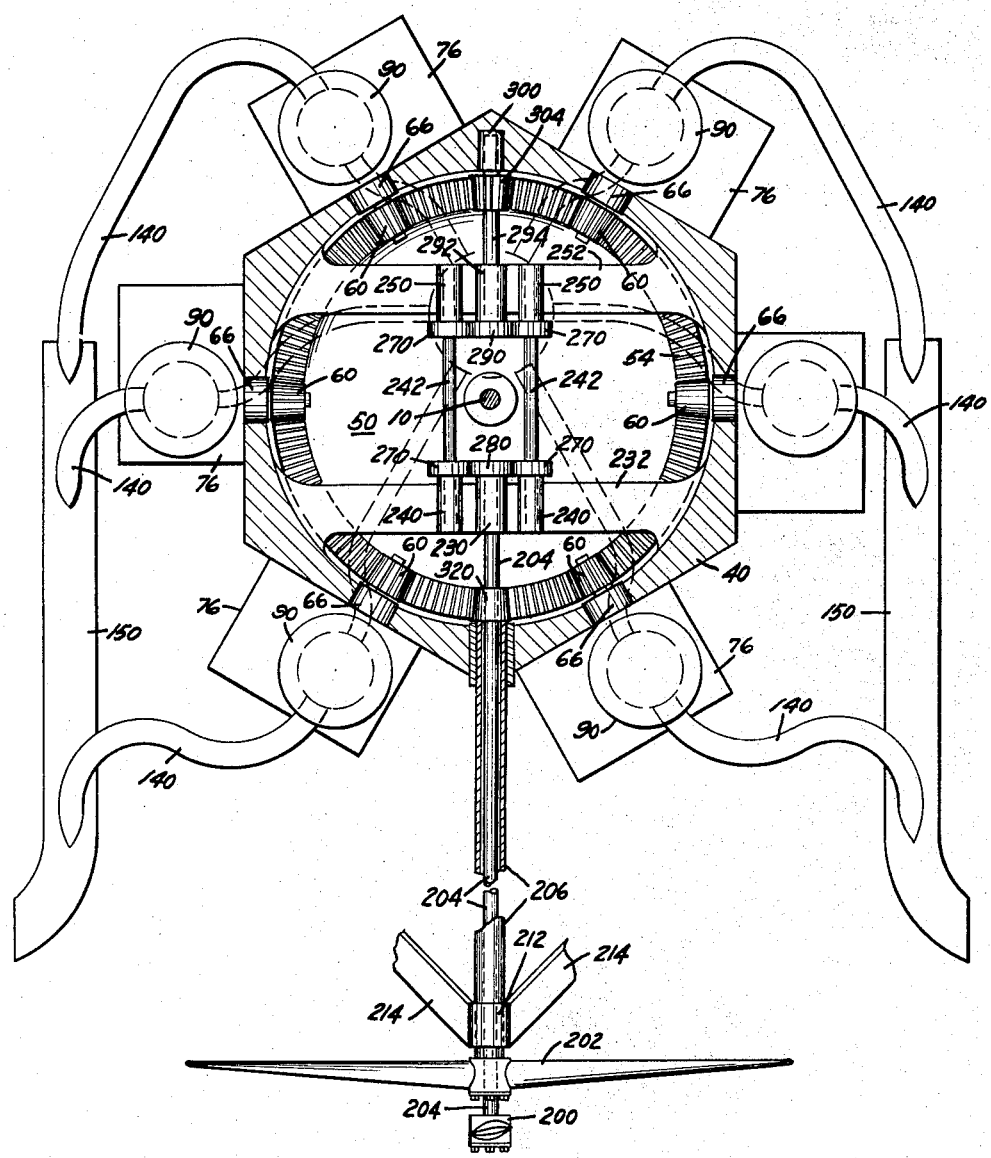
Fig. 2 is a top plan view of the engine in Fig. 1, shown with upper portion thereof broken away for illustrating the interior construction. The view also shows two vertically-rotating propellers connected to the engine by shafts, parts of which are broken away and bearing support assembly parts of which are also broken away for convenience of illustration.

The housing 74 is substantially of box shape and is suitably fixed to the housing portions 40 and 44 on the outer side thereof, and for this reason the housings 40 and 44 preferably have flat edge portions on their periphery as best seen at 81 in Figure 2, the flat edge portions being equal in length. As best seen in Figure 2, the housings 40 and 44 of the engine shown in the drawings has six flat sides 81.

As best seen in Figure 1, the offset or crankthrow portion 70 of each crankshaft 64 has at least one and preferably two connecting rods 80 attached to it. When two connecting rods 80 are used, one can be attached by suitable bearing means 82 of an ordinary nature and the other can be attached by bearing means disposed on the ends of a forked portion 84 attached to the end of the other connecting rod 80 with one of the terminal ends of the forked portion 84 connected to a bearing member on one side of the bearing member 82 and the other connected to a bearing member on the other side of the bearing member 82.

The piston rods 80 extend outwardly through the housings 74 respectively, and approximately radially with respect to the crankshaft 64, being connected at their outer ends to pistons, not shown, disposed in cylinders 90, the cylinders 90 are at least one and preferably two for each housing 74 and with one cylinder 90 disposed above and one disposed below the housing 74.

The cylinders 90 are internal combustion cylinders and are associated with all usual parts such as intake and exhaust valves, not shown, valve control assemblies, not shown, and spark plugs, two of which can be seen at 100 in Figure 1, all of these parts forming a power unit.

The valve control assemblies are operated by a driving gear 104 attached to the crankshaft 64 and a much larger driven gear 108 mounted on a camshaft 110, a part of which can be seen in Figure 1 at 112 which latter has cams on it for actuating valve tappets connected to valve tappet rods extending outwardly to rocker arm means and to intake and exhaust valves on the respective cylinders 90, the latter parts not being shown.

Each cylinder 90 is supplied with fuel from a fuel supply system, a part of which is disposed in a housing 120 at the bottom of the engine, and another part of which is disposed in a similar housing 122 at the top of the engine. The housings 120 and 122 are connected with the fuel intake openings of the cylinders 90 on their respective sides of the engine by means of fuel intake headers 130 and 132 respectively.

The exhaust products from the cylinders 90 pass from the outlet openings therein and out through exhaust headers 140 and 142, respectively, leading to main exhaust headers 150 which are preferably disposed one on each side of the engine.

As best seen in Figure 2, the engine is particularly well adapted for the application thereto of driving means for propellers at the rear of the aircraft.

As best seen in Figure 2, at the rearward end of the aircraft, not shown, one or more propellers can be placed, and two propellers 200 and 202 are shown in Figure 2. The propeller 200 is attached to an inner shaft 204 which extends through a hollow outer shaft 206 to which latter the propeller 292 it attached.

The outer shaft 206 is rotatably supported in a bearing 212, which latter is rigidly secured to the aircraft, not shown, by suitable bracing means including two braces 214, attached to the bearing 212 on each side thereof and extending divergently inwardly therefrom.

The inner shaft 204 is rotatable in the outer shaft 206, and extends inwardly to a bearing 230 mounted on a web 232, which latter extends transversely of the shaft 204 and is attached at its end to opposite sides of the housing 40.

The web 232 is disposed on the same side of the vertical shaft 12 as are the propellers 200 and 202.

Two other bearing members 240 are mounted on the web 232, one on each side of the bearing 230. Two shafts 242 are mounted in the bearings 240 respectively, and are disposed in parallelism with the inner shaft 204 and the shafts 242 are disposed extending past the inner and outer vertical shafts 10 and 12, and have their forward ends mounted in suitable bearings 250, attached to a web 252, which latter extends between opposite sides of the housing 40 and across the open center 46 thereof.

The shafts 242 each have two gears thereon, each gear being disposed adjacent the inner side of a respective web 232 and 252. The gears on the shafts 242, are not shown, but are disposed in gear housings 270 which are attached to the bearings 240 and 250 respectively. The gears in the forward two housing 270 are disposed in mesh with the gear disposed in a housing 280, which latter is disposed between the gears in the housings 270, the gear 80 being disposed on the shaft 204.

The gears in the rearward two of the housing 270 are disposed in mesh with a gear, not shown, disposed in a gear housing 290, the housing 290 being attached to the housing of a bearing 292 which latter is disposed between the bearings 250 and in alignment with the shaft 204, although the shaft 204 terminates at the gear in the housing 280.

A propeller pinion shaft 294 extends through the bearing 292 and is secured to the gear in the interior of the housing 290, the forward end of the shaft 294 being rotatably received in a suitable bearing 300 mounted in a recess in the housing member 40.

On the shaft 294 is a propeller pinion 304, which is disposed in mesh with the large gears 50 and 52 whereby the pinion 304 is driven by the gears 50 and 52 for driving the shaft 294 which, as described, is interconnected with the shaft 242 which, as also described, are interconnected with the shaft 204 for driving the latter.

Another pinion 320 is disposed on the rearward side of and disposed between the gears 50 and 52, whereby the pinion 320 is driven by the gears 50 and 52. The pinion 320 is disposed on the inner shaft 204 whereby the inner shaft 204 is driven for rotating the propeller 200.

Since the pinions 304 and 320 are on opposite sides of the gears 50 and 52, they rotate in opposite directions, whereby the shafts 204 and 206 cause the propellers 200 and 202 to rotate in opposite directions. This causes a balanced propeller effect for propelling the helicopter forward.

In operation it will be seen that the relatively small size of the driving pinions 60 in comparison with the large driven gears 46 and 50 will cause the propeller blades 14 and 16 to have the low speed desirable in a helicopter blade without the necessity of gear reduction means in addition to the engine as above described.

Also, the vertical lift propellers 14 and 16 rotate in opposite directions, as also do the forward propulsional propellers 200 and 202, whereby all propeller motion is counterbalanced for the reduction of vibration giving better riding qualities to the aircraft, and longer life to the aircraft parts.

The engine has a lubrication system, not shown, of a suitable and conventional design.

From the foregoing description, it is thought to be obvious that a helicopter engine constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A helicopter engine and propeller assembly comprising a pair of counter-rotating horizontal propellers disposed one above the other, an inner shaft extending downwardly from the upper one of said propellers, a housing disposed beneath said propellers, said housing having a hollow interior, means rotatably mounting the lower end of said inner shaft in said housing, a lower driven first gear disposed in said housing and attached to said inner shaft and having a circular row of teeth on the upper side thereof, and outer hollow shaft attached to said lower propeller and extending downwardly into said housing, means rotatably mounting said outer hollow shaft in said housing, the lower end of said outer hollow shaft extending into the hollow interior of said housing, a means for rotatably supporting the upper end of said outer hollow shaft, a second horizontally rotating upper gear disposed in said housing and attached to the lower end of said outer hollow shaft, said second gear having teeth disposed in a ring on the under side thereof directly above and facing the teeth of said first gear, a plurality of pinions disposed between and driving said first and second gears, pinion shafts attached to and supporting said pinions respectively, means rotatably mounting said pinion shafts on said housing respectively, said pinion shafts extending generally radially outwardly from the center of said horizontal gears, and power units attached to the outer ends of said pinion shafts respectively for driving said pinions, first and second propellers rotating in vertical planes for mounting at the rear of a helicopter, a horizontally extending shaft extending from the first of said vertically rotating propellers inwardly past the rings of teeth of said upper and lower horizontally rotating gears and terminating inside said rings of teeth and between said rings of teeth and the centers of said horizontally rotating gears, mounting means rotatably mounting the inner end of said horizontal shaft, said mounting means being attached to said housing, a first propeller pinion disposed on the opposite side of said horizontal gears from said vertical propellers, said first propeller pinion being disposed between and in mesh with the teeth on said horizontal gears, a first propeller pinion shaft attached to and supporting said propeller pinion, means rotatably mounting said propeller pinion shaft on said housing, and means drivably interconnecting said propeller pinion shaft and the inner end of said inner horizontal shaft, said second vertically rotating propeller being disposed inwardly of said first vertically rotating propeller a short distance, an outer hollow shaft attached to said second vertically rotating propeller and extending inwardly therefrom toward the centers of said upper and lower horizontal gears, a second propeller pinion mounted on said outer hollow shaft and disposed in mesh with said upper and lower horizontal gears, said second propeller pinion being disposed at the point at which said outer hollow shaft meets the teeth on said upper and lower horizontally rotating gears whereby said second pinion causes the outer hollow shaft to rotate in a direction opposite to the rotation of said inner horizontal shaft, and a bearing means rotatably supporting the outer end of said outer hollow horizontal shaft, and bracing means connected to said bearing means for supporting said bearing means.

2. The combination of claim 1 in which said power units comprise pairs of engines arranged opposite each other and above and below said pinion shafts respectively.

3. A helicopter engine and propeller assembly comprising a pair of counter-rotating horizontal propellers disposed one above the other, an inner shaft extending downwardly from the upper one of said propellers, a housing disposed beneath said propellers, said housing having a hollow interior, means rotatably mounting the lower end of said inner shaft in said housing, a lower driven first gear disposed in said housing and attached to said inner shaft and having a circular row of teeth on the upper side thereof, an outer hollow shaft attached to said lower propeller and extending downwardly into said housing, means rotatably mounting said outer hollow shaft in said housing, the lower end of said outer hollow shaft extending into the hollow interior of said housing, a means for rotatably supporting the upper end of said outer hollow shaft, a second horizontally rotating upper gear disposed in said housing and attached to the lower end of said outer hollow shaft, said second gear having teeth disposed in a ring on the under side thereof directly above and facing the teeth of said first gear, a pinion disposed between and driving said first and second gears, at least one pinion shaft attached to and supporting said pinion, means rotatably mounting said pinion shaft on said housing, said pinion shaft extending generally radially outwardly from the center of said horizontal gears, and a power unit attached to the outer end of said pinion shaft for driving said pinion, first and second propellers rotating in vertical planes, a horizontally extending shaft extending from the first of said vertically rotating propellers inwardly past the sides of the rings of teeth of said upper and lower horizontally rotating gears, mounting means rotatably mounting the inner end of said horizontal shaft on said housing, a first propeller pinion disposed on the opposite side of said horizontal gears from said vertical propellers, said first propeller pinion being disposed between and in mesh with the teeth on said horizontal gears, a first propeller pinion shaft attached to and supporting said propeller pinion, means rotatably mounting said propellers pinion shaft on said housing, and means drivably interconnecting said propeller pinion shaft and the inner end of said inner horizontal shaft, said second vertically rotating propeller being disposed inwardly of said first vertically rotating propeller a short distance, an outer hollow shaft attached to said second vertically rotating propeller and extending inwardly therefrom toward the centers of said upper and lower horizontal gears, a second propeller pinion mounted on said outer hollow shaft and disposed in mesh with said upper and lower horizontal gears, said second propeller pinion being disposed at the point at which said outer hollow shaft meets the teeth on said upper and lower horizontally rotating gears whereby said second pinion causes the outer hollow shaft to rotate in a direction opposite to the rotation of said inner horizontal shaft and a bearing means rotatably supporting the outer end of said outer hollow horizontal shaft, and bracing means connected to said bearing means for supporting said bearings means.

References Cited in the file of this patent

UNITED STATES PATENTS

| | | |
|---|---|---|
| 968,120 | Buss | Aug. 23, 1910 |
| 1,057,444 | Mott | Apr. 1, 1913 |
| 2,584,115 | Dinsmoor | Feb. 5, 1952 |